H. W. SMOCK.
TRENCHING TOOL.
APPLICATION FILED JULY 28, 1917.
1,245,812.
Patented Nov. 6, 1917.
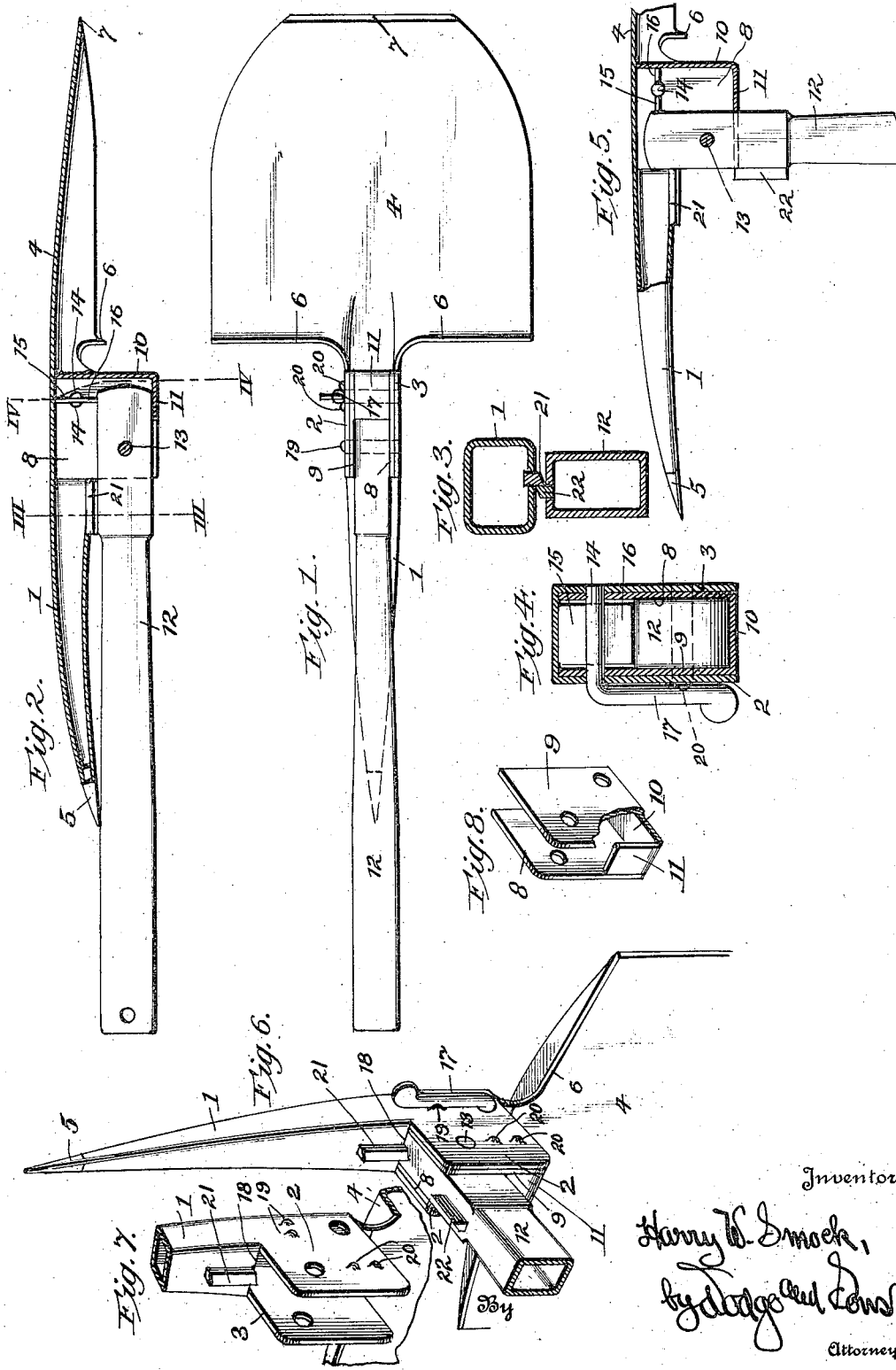
Inventor:
Harry W. Smock,
by Dagg and Dows
Attorneys

UNITED STATES PATENT OFFICE.

HARRY W. SMOCK, OF ASBURY PARK, NEW JERSEY.

TRENCHING-TOOL.

1,245,812.  Specification of Letters Patent.  Patented Nov. 6, 1917.

Application filed July 28, 1917. Serial No. 183,305.

*To all whom it may concern:*

Be it known that I, HARRY W. SMOCK, a citizen of the United States, residing at Asbury Park, in the county of Monmouth and State of New Jersey, have invented a certain new and useful Improvement in Trenching-Tools, of which the following is a specification.

My present invention pertains to an improved trenching tool, and has for its main object the production of a tool which, while being of light weight, presents a maximum of strength as well as a simplicity of construction.

The tool is designed to present a pick, a combined shovel and mattock, and a wire-cutter, and is so constructed that the tool element or body may be readily and positively locked in either of its adjusted positions with reference to the handle.

The tool is illustrated in the annexed drawings, wherein:

Figure 1 is a plan or face view thereof, with the shovel blade lying in alinement with the handle;

Fig. 2 a longitudinal sectional elevation;

Fig. 3 a transverse section on the line III—III of Fig. 2;

Fig. 4 a like view on the line IV—IV of the same figure;

Fig. 5 a sectional elevation, showing the handle as locked at right angles to the tool element;

Fig. 6 a perspective view of a portion of the tool and handle;

Fig. 7 a similar view of the body or hub intermediate the pick and blade portions of the tool; and Fig. 8 a perspective view of the strengthening box or frame employed in connection with the hub.

The pick element 1, the wings or plates 2 and 3 of the hub, and the blade or shovel member 4, are all preferably formed from a single piece of high-grade sheet steel stamped or cut out and bent to form. The abutting edges of the pick element are brazed and a point 5 sweated in place.

The shovel element 4, at the upper or inner end, is flanged, as at 6, said flanges merging into the wings 2 and 3, whereby the structure is materially strengthened. The outer end is cut straight across and sharpened, as at 7, whereby a cutting edge is produced, enabling one to use the tool as a mattock, or hatchet, when the handle stands at right angles to the tool, as in Fig. 5.

Mounted between the wings 2 and 3 of the hub is a strengthening box or frame, best shown in Fig. 8. It is formed preferably from a single piece of metal so bent as to produce two side plates 8 and 9, a filler plate 10, and a stop plate 11. The side plates 8 and 9 are spaced apart such a distance that when the box is inserted between the wings 2 and 3 they make close contact therewith, the filler plate 10 extending inwardly between the flanged sections 6, where they merge into the wings 2 and 3. The box will be brazed or sweated in place. Plate 11 forms a stop or abutment for the handle 12 when in either of its adjusted positions; see Figs. 2 and 5.

The handle, which is preferably hollow and made of steel, is rectangular in form at its inner end, and is fulcrumed on a through-pin or rivet 13, which passes through the handle and through the wings 2 and 3 of the hub, and also through the plates 8 and 9. The pin 13 passes through the axis of the handle and through the hub and box at a point nearer the bottom than the top thereof, and upon the opposite side of the center line of the box to that of the pivot pin 14 of the locking member. The lock comprises a plate-like member having wings 15 and 16 diametrically disposed upon the pin 14. Said pin has formed as an extension thereof a handle or crank 17, which lies close to the outer face of wing 2.

The parts are so proportioned that when the tool is to be employed as a shovel (Figs. 1 and 2) the point 5 bears against the handle 12, at which time crank 17 is brought to the position shown in Fig. 4 and the wings 15 and 16 bear, respectively, against the inner face of the outer wall of the pick (or that portion of the structure between the pick and shovel) and against the handle. The opposite face of the handle at such time finds a bearing against the inner face of the stop 11, and the parts are held firmly in place.

When the handle 12 is brought to the position shown in Fig. 5, the lock is first turned so as to release the handle and then brought to bear against the handle and the inner face of filler piece or element 10. The handle at such time bears against the edge of stop member 11 and, at its opposite side and adjacent its upper end against the edge 18 of the lower or inner wall of the pick section. Thus, under both adjustments the handle is positively locked and braced, and inasmuch as the lock has a fair and full bearing at both ends against the parts there is little or no strain imposed upon its supporting pin 14. Pin 13 is also relieved of considerable strain by reason of the manner of locking employed, and for the further reason that it has a direct bearing upon other parts, as above set forth.

In order to prevent the lock from jumping, and to indicate when it has been properly positioned, I may form two pairs of lugs or projections 19, 19 and 20, 20 upon plate 2, between which crank 17 will spring when it is brought to one or another of its adjusted positions. Such lugs, however, I find are not essential to the lock.

Wire-cutting jaws 21, 22 may be secured to the pick and handle, respectively, and by reason of their location adjacent the pivot pin 13 a powerful leverage is secured with the handle 12 and the pick section 1.

The tool as above set forth fills all the requirements of the trench tool of today. It is strong, light and compact; it affords a pick, a shovel, a mattock or hatchet (this latter by reason of the straight, sharpened edge 7) and a wire-cutter.

The lock being inclosed except for the crank or lever 17, is not subject to injury and is not liable to be clogged by dirt.

Having thus described my invention, what I claim is:

1. In a combined tool, the combination of a tool element having a hub; a handle pivoted in said hub; and a lock pivotally supported in said hub and inclosed thereby, said lock bearing upon the handle and the oppositely-disposed portion or member of the tool under respective adjustments of the handle with reference to the tool element.

2. In a combined tool, the combination of a tool element having a hub; a handle pivotally connected to the hub, with the end of the handle extending thereinto; and a plate-like locking element pivotally mounted within the hub, said element under one adjustment of the handle bearing against the handle and the inner face of the opposite wall of the tool element, and under its other adjustment against the handle and the oppositely-disposed wall of the hub.

3. In a combined tool, the combination of two tool elements and an interposed angular hub; a handle pivoted adjacent one of the lower corners of said hub; and a plate-like lock pivotally mounted within the hub at the opposite upper portion of the hub, said lock bearing, respectively, against the adjacent face of the handle under different adjustments thereof with reference to the tool elements and hub, and against the oppositely-disposed wall of the tool element or the hub.

4. In a combined tool, the combination of a tool element having a pair of laterally-extending wings; a box-like member embraced by said wings, said element comprising two face plates which bear against said wings, a filler plate, and a stop element, said wings and box forming a hub; a handle pivoted between said wings, the inner end of the handle, under one adjustment, lying in contact with the inner face of the stop element, and under another adjustment against the edge thereof; and a lock housed within the hub, adapted to contact with the inner end of the handle and to hold the same against movement with reference to the hub and tool elements.

5. In a combined tool, the combination of alined tool elements and an intermediate hub; said elements and hub being formed from a single piece of metal bent to form; a handle pivotally connected to the hub and adapted to be brought into parallelism with said tool elements or at right angles thereto; a plate-like lock pivoted within the upper portion of the hub and housed thereby; and a lever connected to said lock and lying alongside one of the outer faces of said hub.

In testimony whereof I have signed my name to this specification.

HARRY W. SMOCK.

Copies of this patent may be obtained for five cents each, by addressing the "Commissioner of Patents, Washington, D. C."